United States Patent [19]

Fendley et al.

[11] Patent Number: 4,559,019
[45] Date of Patent: Dec. 17, 1985

[54] AUTOMATIC GUN MOUNT ALIGNMENT APPARATUS

[75] Inventors: James R. Fendley, Arlington Heights; James L. Kraner, Barrington; Raymond J. Pekosh, Niles, all of Ill.

[73] Assignee: Zenith Electronics Corporation, Glenview, Ill.

[21] Appl. No.: 512,874

[22] Filed: Jul. 12, 1983

[51] Int. Cl.[4] .............................................. H01J 9/18
[52] U.S. Cl. ..................................... 445/67; 250/204
[58] Field of Search ................... 445/34, 67; 356/400; 250/204

[56] References Cited

U.S. PATENT DOCUMENTS 3,612,881 10/1971 King ................................... 250/204
4,105,339 8/1978 Wirtanen ....................... 356/400 X
4,148,117 4/1979 Braeke et al. .................... 445/34 X
4,189,814 2/1980 Ottos ................................ 445/34 X

FOREIGN PATENT DOCUMENTS 103231 8/1982 Japan .................................... 445/34

578563 10/1977 U.S.S.R. ............................. 356/400

Primary Examiner—Kenneth J. Ramsey
Attorney, Agent, or Firm—Cornelius J. O'Connor

[57] ABSTRACT

Apparatus for automatically aligning a tri-beam electron gun mount, which mount includes an electrode having an optical passage therethrough, relative to the phosphor pattern in a CRT bulb destined to receive the mount. The gun mount is rotatably supported, with its geometric axis coincident with an extension of the bulb's neck axis, for presentation to a driver. A laser beam is split to form a pair of beams which are directed along paths which intersect within the optical passage and are thereafter individually intercepted by an assigned light detector. The detectors develop signals which are applied to an error detector comprising a differential amplifier. A central signal derived from the amplifier energizes the gun mount driver which rotates the gun mount until identical signals are outputed by the light detectors. With the gun mount then optimally oriented, it is locked preparatory to its insertion in the CRT bulb.

8 Claims, 5 Drawing Figures

AUTOMATIC GUN MOUNT ALIGNMENT APPARATUS

This invention relates, in general, to the manufacture of color cathode ray tubes but more particularly to apparatus and to a method for automatically aligning a tri-beam electron gun mount relative to the phosphor pattern deposited on the target surface of the tube face panel prior to sealing the gun mount into the neck of the bulb.

The color reproducing cathode ray tubes employed in color television receivers today utilize a luminescent screen pattern comprising a multitude of interspersed elemental areas formed in distinct groups. In general, a screen of the type herein considered includes three different groups of phosphor target areas which emit light corresponding to the green, blue and red portions of the visible spectrum. The individual phosphor areas may comprise minute dots, usually of circular configuration, or, as more commonly employed in state of the art tubes, the target areas can comprise extremely narrow strips or bands of phosphor that extend across the target surface.

In practice, such multi-color targets are deposited directly on the inside surface of the cathode ray tube face panel by means of photographic techniques. A known and widely used method of preparing color phosphor screens utilizes a process analogous to familiar photographic techniques. To this end, a slurry comprising phosphor particles suspended in a photosensitive organic gel is applied to the inside surface of a face panel. Thereafter, selected areas of the coating are exposed to actinic light through the apertures of a suitable stencil, e.g., a shadow mask, to provide a latent photographic image of the desired phosphor pattern on the substrate. The substrate is then washed to remove the unexposed portion of the coating in the case of positive developing resists or, the exposed portion, in the case of negative resists. These steps are then repeated for each of the other color phosphors with a source of actinic light disposed at appropriately different positions with respect to the shadow mask. In practice then, the repositioning of the light source in exposing the screen through the mask is such as to effectively mimic the positions of the three electron guns later to be fitted to the tube in a subsequent manufacturing process. In any event, it should be noted that the resultant luminescent screen pattern bears a unique geometric relationship, or orientation, to the light sources and, thereby, to the electron beam axes of a subsequently fitted electron gun mount. A certain angular deviation of the gun mount from the aforesaid geometric relationship is designated gun rotation error.

In prior art practice, the uniting of an electron gun mount with the neck of a cathode ray tube bulb is preceded by an initial gun mount pre-sorting. This step entails an inspection of completed mounts to determine the accuracy with which the gun electrode array is aligned with respect to a reference position defined by the wire PIN pattern that is part of the stem.

This procedure produces, in general, three cells, or groupings, of gun mounts; the first would include those mounts in which the alignment of the gun structure relative to the stem pin wires was adjudged sufficiently accurate as to require little, if any, subsequent adjustment of gun mount alignment (relative to its stem) when it was presented to the tube neck for sealing therein.

Another group of gun mounts would be characterized by what might be designated a plus error; which error would represent a departure of the gun structure alignment (again, relative to the stem) in a predetermined direction from a desired location relative to the press while those mounts having a gun structure departing in the opposite direction from the acceptable norm would be characterized as exhibiting a negative error.

Accordingly, at the gun seal station, a particular fixture, designed to accommodate accurately aligned mounts, is positioned beneath the open mouth of the tube neck to present and, initially, align the gun mount with respect to the phosphor pattern deposited upon the target surface of the tube. Thereafter, the tube mount is elevated into the open end of the neck and, by resort to known techniques, sealed therein.

Turning then to the gun mounts having a positive or negative departure from the norm, a different fixture, in each case, is required at the gun seal station to "bias", so to speak, the gun mount in the direction necessary to offset the positive or negative departure so as to effect an acceptable initial alignment of the gun mount relative to the phosphor pattern of the tube destined to receive the mount. In each case, after the initial alignment is effected, a final alignment, if called for, must be made.

As an alternative to such time consuming and costly procedures, apparatus for automatically aligning the gun mount relative to the phosphor pattern, prior to the neck sealing operation, have been attempted. However, they do not offer the flexibility nor the accuracy of the apparatus described and claimed herein. For example, in U.S. Pat. No. 4,189,814 there is disclosed apparatus for aligning a gun assembly which entails transmitting laser light pulses through alignment apertures in an electrode of the gun assembly. Thereafter, subsequent to detection, the light pulses are counted and applied to a stepping means for rotatably positioning the gun support assembly until a desired orientation of the gun mount is attained. In addition to a light pulsing unit and a stepping motor, the '814 disclosure also requires an up-down counter to process the detected light pulses to provide the proper control signal for the stepping motor. All in all, an expensive and intricate arrangement not tolerant of any but very precise set-up and maintenance procedures.

Another disclosure, U.S. Pat. No. 4,148,117 resorts to the use of a beam of incoherent light which is caused to illuminate position marks, which take the form of a pair of slots in oppositely disposed walls of a gun electrode. Upon transversing the slots, the light impinges upon a photodetector that converts the quantity of light received into a signal for adjusting the position of the electron mount. In one embodiment disclosed in the '117 patent, resort is had to a pair of light beams which are directed to intersect one another. However, as disclosed therein, the light beams emerging from the slots are successively imaged on a single photoreceiver to produce two maximum values on the intensity curve of the photoreceivers. The derivation of a correction signal then entails dividing in half, the distance separating the points where the maximum values occur to attain what the patentee characterizes as ". . . the ideal position of the electron gun system." On the other hand, the present invention eliminates the need for relative rotation of gun and beam, in the case where no significant rotation error is present. Significant errors are detected and corrected without the need for oscillatory rotary motion.

OBJECTS OF THE INVENTION

Accordingly, it is a general object of the invention to provide electron gun mount alignment apparatus which rapidly and accurately establishes optimal gun mount orientation relative to the phosphor screen in a color cathode ray tube bulb.

It is a specific object of the invention to provide improved apparatus for automatically aligning a tri-beam electron gun mount relative to the patterned phosphor screen of a color reproducing cathode ray tube bulb prior to uniting the gun mount with the bulb.

It is another specific object of the invention to provide gun mount alignment apparatus which dispenses with the complex set-up and maintenance procedures characteristic of prior art practices.

SUMMARY OF THE INVENTION

An apparatus is disclosed for automatically aligning a tri-beam electron gun mount relative to the phosphor pattern deposited upon the target surface of the face panel of a color reproducing cathode ray tube bulb. The apparatus is used at a gun-seal assembly station employed in the processing of the cathode ray tube bulb, which station has means for supporting the bulb so that a defined axis of the phosphor pattern is established and maintained in a reference position. The gun mount includes an electrode structure which has an unobstructed optical passage therethrough, the central axis of this passage being substantially perpendicular to the geometric axis of the gun mount. The alignment apparatus comprises means for supporting the gun mount for rotation about its geometric axis and with that axis substantially coincident with an extension of the neck axis of the bulb. A driver is included for rotating the gun mount about its geometric axis. A source of electromagnetic radiation is employed for developing a beam linearly polarized of spatially coherent light. A beam expander, which responds to the output of the light source, produces an expanded beam of substantially collimated light. A beam splitter, in turn, responds to the output of the beam expander to derive first and second relatively stable, in time, beams of substantially collimated linearly polarized light. In the preferred embodiment, these beams are of approximately equal intensity. Means are provided for directing the first and second beams along paths which extend through and intersect within the electrode structure optical passage. Means are interposed between the beam splitter and the electrode passage for truncating the transverse extent of the first and second beams. First and second light detector devices, terminating the first and second beam paths, individually respond to an assigned one of the first and second truncated beams, subsequent to their transmission through the electrode optical passage, to develop respective first and second detector signals each of a magnitude proportional to the quantity of collimated light energy instantaneously transmitted through said electrode optical passage. Finally, error detector means are provided which respond to the detector signals to develop a resultant control signal for application to the gun mount driver. This control signal has a magnitude and a sense determined by the algebraic difference of the detector signals. The control signal is effective to induce rotation of the gun mount driver in a direction to produce a substantially identical output signal from each of the detector devices thereby establishing optimal gun mount orientation relative to the defined axis of the phosphor pattern.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

DESCRIPTION OF THE PREFERRED EMBODIMENT

Prior to commencing a discussion of the invention, it should be noted that illustrations of portions of the disclosed gun mount aligning apparatus, as well as certain explanatory diagrams, have been intentionally exaggerated in order to facilitate the presentation, as well as an understanding, of the invention.

Figure 1:
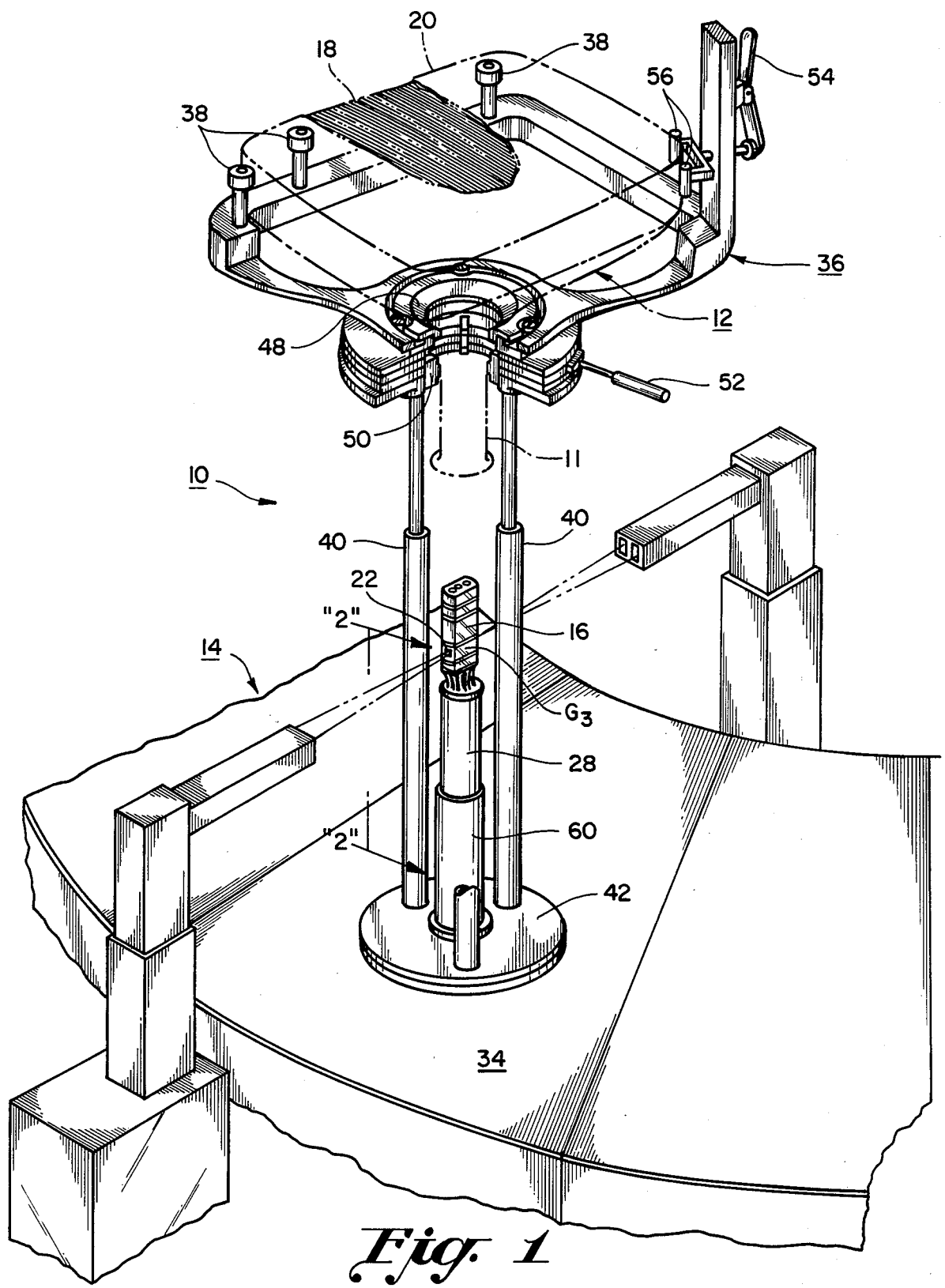
FIG. 1 is a perspective elevational view, partially fragmented, of a gun seal assembly station utilizing the inventive apparatus for automatically aligning an electron gun mount relative to the phosphor pattern of the cathode ray tube bulb to which it is to be united.

FIG. 1 depicts those portions of a gun seal assembly station 10 germane to the subject invention. The illustrated station is but one of a plurality of stations employed in sealing an electron gun within the neck 11 of a color television cathode ray tube bulb 12. Station 10 is specifically concerned with apparatus 14 for automatically aligning a tri-beam electron gun mount 16 relative to a patterned phosphor screen 18 which is deposited upon the inside, or target, surface of the face panel 20 of bulb 12. As shown, screen 18 comprises a line screen pattern to accommodate gun mount 16 which, as depicted, adopts an in-line gun construction.

Figure 2:
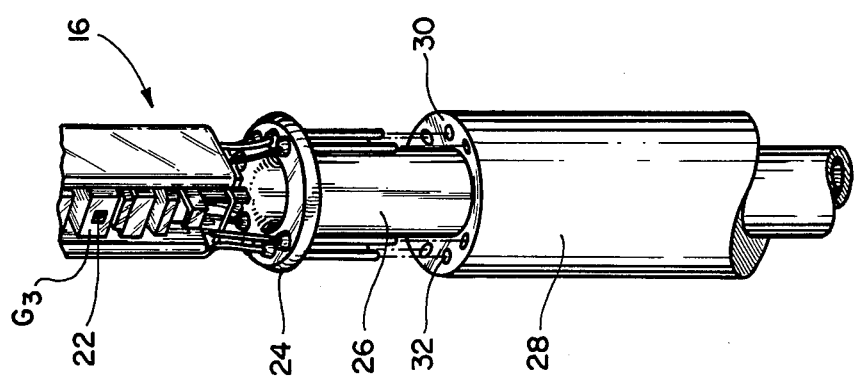
FIG. 2 is a detail of the gun mount and support spindle therefor taken along lines "2"—"2" in FIG. 1.
Figure 5:
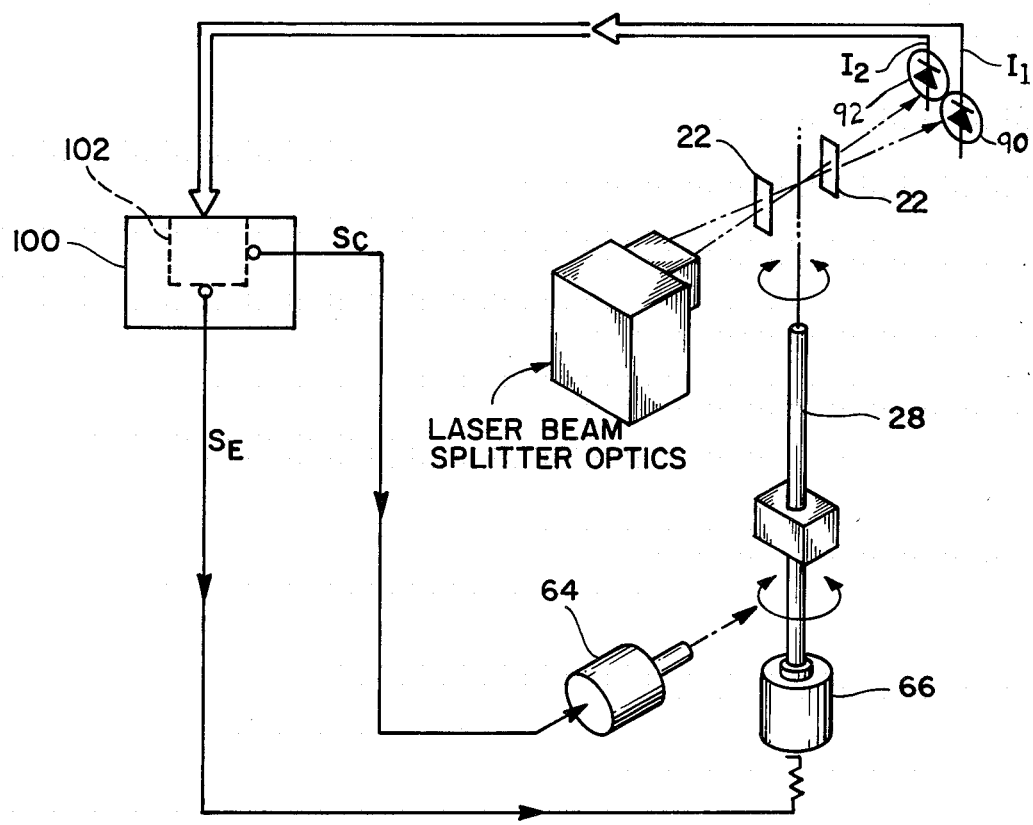
FIG. 5 is a partially schematic representation of the apparatus and control circuitry employed for automatically aligning an electron gun mount.

Structurally, each of the three guns of mount 16 comprises a series of cascaded electrodes which serve to shape and accelerate an electron beam. In practice, the cascaded electrodes are so formed as to permit a degree of sharing by each of the three beams. In this regard, the electrode arrangement for mount 16 can adopt, in general, the gun construction disclosed in U.S. Pat. No. 4,058,753, assigned to the same assignee as the subject invention. As best seen in FIG. 2, at least one of the electrodes, that designated G3 (although almost any one could be used), has an unobstructed optical passage 22 therethrough, the central axis of that passage being substantially perpendicular to the geometric axis of the mount which, in turn, coincides with the axis of the center, or green beam, gun. In accordance with conventional practice, each electrode is fitted with a conductive lead which, in turn, is welded to a connector pin anchored in a glass press 24 which surmounts an exhaust tubulation 26.

Gun mount 16 is supported upon a spindle 28 which is axially relieved to receive the tubulation 26 of the gun mount. The upper face 30 of spindle 28 comprises a multi-apertured key 32, see FIG. 2, patterned to accommodate the connector pins depending from press 24 and to thereby establish gun mount 16 in an initial approximately correct orientation relative to screen 18 of bulb 12. The manner in which indexing spindle 28 cooperates with the gun mount automatic alignment apparatus will be described in a moment.

Figure 3:
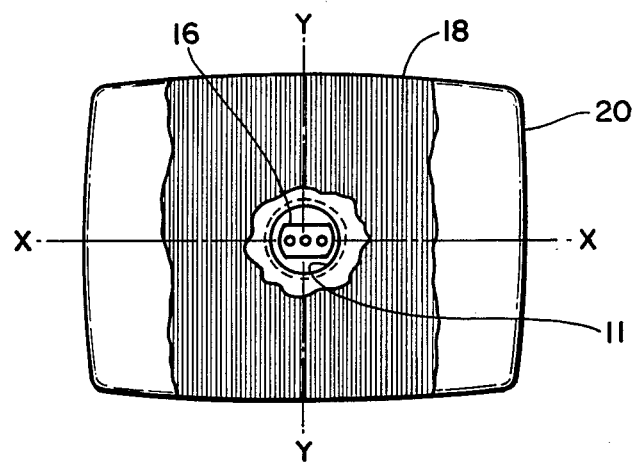
FIG. 3 is a fragmented plan view of the cathode ray tube shown in FIG. 1, illustrating proper alignment of the gun mount and a phosphor stripe pattern.

Station 10 constitutes means for supporting and presenting bulb 12 to gun mount 16 so that a defined axis of phosphor screen 18 is established and maintained in a reference position. For purposes of this discussion, the pattern of phosphor screen 18 can be said to have a major axis X—X and a minor axis Y—Y; the major axis being defined as that axis which traverses the wider dimemsion of the pattern and is perpendicular to the phosphor "lines" forming screen 18, while the minor axis is defined as that which is disposed perpendicular to the major axis (and parallel to the screen "lines") and thus spans the narrow dimension of the phosphor pattern, see FIG. 3. Moreover, at this juncture, it can be observed that FIG. 3 depicts optimal orientation of gun mount 16 relative to defined major axis X—X in that the plane within which the three electron beams lie is coincident with axis X—X of screen 18.

In this regard, therefore, it is essential that, prior to sealing gun mount 16 into neck 11 of the bulb, one of the defined axes of phosphor pattern 18, e.g., major axis X—X, be established and maintained in a reference position. This positioning of the phosphor pattern is provided by a bulb holder that extends above the deck section 34 of station 10 and comprises a yoke 36 having three upright indexing pins 38 so positioned as to bear against three indexing surfaces located about the periphery of the face panel 20 of a bulb inserted in the yoke. Since these indexing surfaces figured in an important and controlling role in the screening process of the panel, they remain an important factor insofar as establishing an orientation of the phosphor pattern is concerned.

Yoke 36 is supported by a vertically disposed tripod arrangement of pillars 40 which, in turn, are anchored to a pedestal 42 that protrudes through deck 34. This pedestal is mounted upon a turntable 44 disposed beneath the deck, see FIG. 4. After a gun mount has been properly aligned and elevated into the neck of the bulb, which procedure is described below, deck 34, together with yoke 36 and bulb 12, are transported to another assembly station where the neck section of the bulb is presented to a bank of flaming jets to initiate the gun sealing process. As deck 34 and the bulb depart from alignment station 10, a motor, not shown, but belted to turntable 44, initiates rotation of pedestal 42 and the bulb and its support apparatus to insure uniform heating of the tube neck.

Prior to gun alignment, bulb 12 must be permitted to seek out its reference position. To this end, yoke 36 is provided with a "floating" bulb support comprising a ring 48 which engages the funnel of the bulb and is freely displaceable in a horizontal plane, refer back to FIG. 1. Associated with floating support 48 is a three jaw neck chuck 50 which has an actuating handle 52 that serves to drive the three jaws of the chuck into a locking peripheral embrace of neck portion 11 of the bulb. This chuck assures that the neck axis of the bulb is vertical preparatory to actuation of a latch 54 that urges a pair of cushioned fingers 56 against one corner of face panel 20 to drive the face panel against indexing pins 38. At this stage, the phosphor pattern 18 is established and maintained in a reference position, that is, a position in which the major axis X—X of the phosphor pattern assumes a fixed orientation to which a gun mount to be affixed to the bulb will be aligned.

Turning now to a further consideration of the apparatus for supporting and automatically aligning the gun mount relative to the phosphor pattern, this apparatus is seen to comprise the earlier referred to spindle 28. The spindle is so located, relative to yoke 36, that its geometric axis is substantially coincident with an extension of the neck axis of a bulb when the phosphor pattern 18 of the bulb has been properly oriented by yoke 36, in the manner as described above. The azimuthal orientation of spindle 28, relative to the bulb suspended overhead, is such as to establish an initial orientation for the gun mount in which the axis of G3 optical passage 22 is substantially, or as nearly so as possible, coincident a projection of major axis X—X of the screen. It then becomes the function of alignment apparatus 14 to automatically establish optimal orientation of the gun mount relative to axis X—X.

To afford a selective rotation of gun mount 16, relative to phosphor pattern 18, the body of spindle 28 is journaled for rotation within a sleeve 60 which is mounted on pedestal 42. The lower extremity of the spindle, on the other hand, extends through the pedestal, as well as through turntable 44, to a drive plate 62 to which it is fixed, see FIG. 4. Plate 62 is coupled to a driver 64 which can be a servomotor or other electromechanical device amenable to actuation by a control signal. Disposed immediately beneath plate 62 is an elevator mechanism 66 comprising an extensible shaft 68 engageable with the underside of spindle plate 62 to elevate a properly aligned gun mount 16 into the neck portion 11 of bulb 12.

Figure 4:
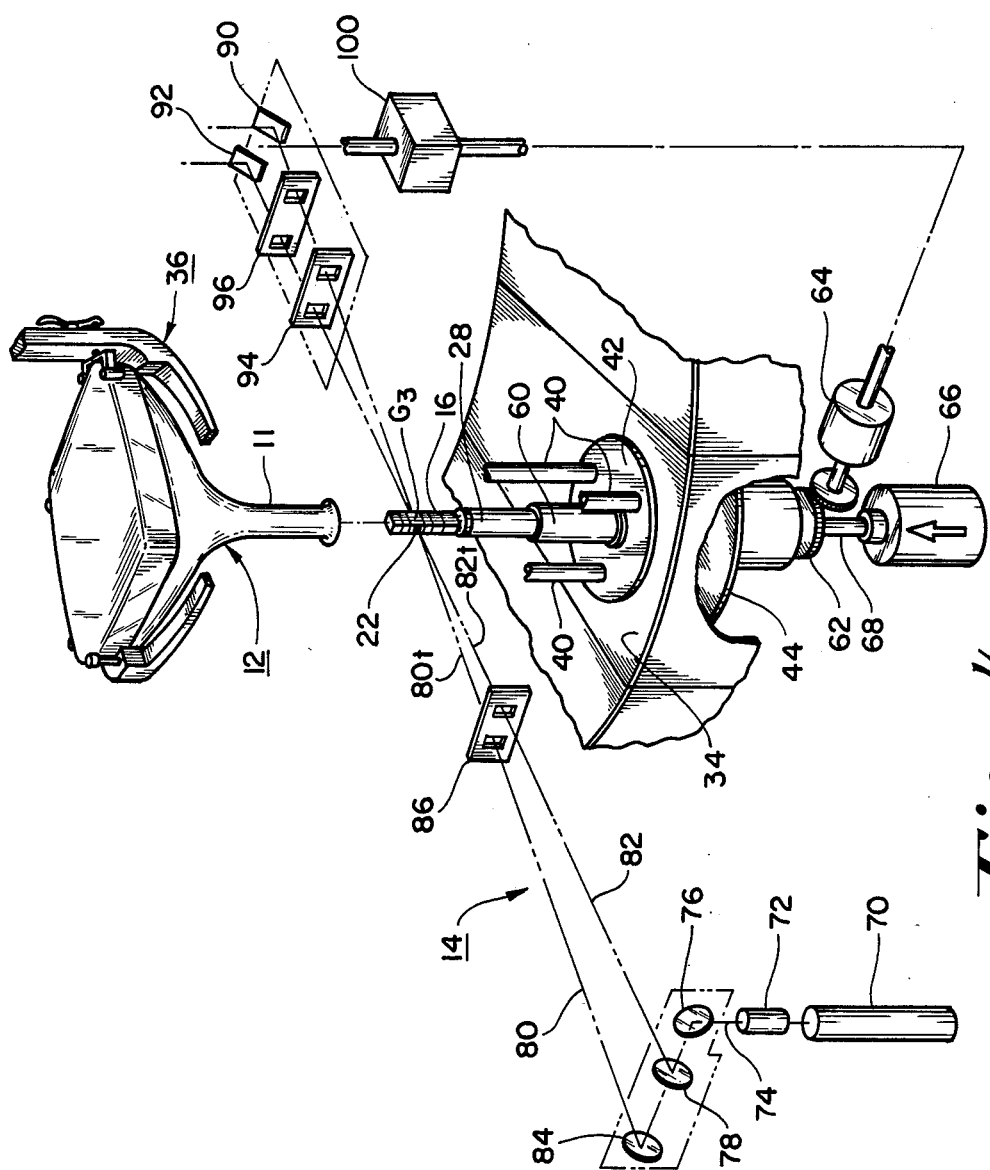
FIG. 4 is another elevational perspective view, also partially fragmented, detailing elements of the assembly shown in FIG. 1.

Returning again to alignment apparatus 14, as shown in FIG. 4 this mechanism further comprises a source 70 of electromagnetic radiation for example, a low power helium-neon red laser. Laser 70 serves to develop a beam of spatially coherent light. In practice, a linearly polarized fundamental transverse mode laser is employed for developing a Gaussian cross-section beam. A beam expander 72 is positioned to respond to the output of laser 70 to produce an expanded beam 74 of substantially collimated light. If desired, a mirror 76, or more than one, can be employed to direct expanded beam 74 along a desired path to a beam splitter 78 which serves to derive first and second relatively stable, in time, beams 80, 82 of substantially collimated light and of substantially equal intensity. A mirror 84 can be employed, in conjunction with beam splitter 78, to determine a desired path for beam 74.

Means, which can include mirror 84, and beam splitter 78 direct beams 80 and 82 along separate paths which extend through and intersect within optical passage 22 in the G3 electrode, preferably at the geometric axis of the gun mount. The choice of the beam intersection angle is determined, in part, by the gun design, in general a satisfactory value has been determined to be that angle equal to arcsin s/d, where s is the width of the electrode passage 22 while d is the outer diameter of the G3 electrode. An EFL gun design of the type described in U.S. Pat. No. 4,058,753, has been found particularly suitable for use in practicing the invention. The diameter of the G3 electrode for such a gun approximates 870 mils; accordingly, a G3 electrode of that diameter having a passage width of 40 mils constitutes a satisfactory arrangement. The quotient 40/870=0.045977, which is the sine of an angle of 2.64 degrees. A limiting aperture 86 may be interposed between beam splitter 78 and mirror 84 and electrode optical passage 22 to provide truncated Gaussian beams 80t and 82t of a desired size.

First and second spaced-apart light detector devices 90, 92 individually respond to beams 80t and 82t, respectively, subsequent to partial transmission of those beams through G3 optical passage 22 and, through light arresters 94, 96 optically aligned with limiting aperture 86 to prevent spill-over of light exiting from G3 optical passage 22. Preferably, detectors 90, 92 are oriented at an angle to beams 80$_t$, 82$_t$ to prevent the detectors from responding to any light that might reflect back from the detectors, which light might then be returned by an electrode of the gun mount, thereby inducing an erroneous response by the detectors. Detector devices 90, 92 develop respective first and second signals $I_1$ and $I_2$, each of a magnitude proportional to the quantity of intercepted light energy instantaneously transmitted through optical passage 22.

In an embodiment of the invention reduced to practice a helium-neon laser was employed to develop a 25 mil diameter beam which, upon exiting from beam expander 72, had a diameter of 250 mils, at its 13.5% relative intensity points, which diameter suitably accommodates the tolerance required to compensate for any lateral offset of the derived beams from their intended paths to G3 optical passage 22.

Error detector means 100 responds to signals $I_1$ and $I_2$ to develop a resultant control signal $S_C$ for application to servomotor 64. More particularly, error detector 100 comprises a differential amplifier 102 which responds to signals $I_1$ and $I_2$ to derive the control signal $S_C$ which has a magnitude indicative of the algebraic difference between the signals as well as a sense, insofar as it determines the direction in which servo 64 is to be driven, that is, clockwise or counterclockwise. The control signal is effective to first, effect a coupling between servo 64 and gun mount spindle drive plate 62 and secondly, induce rotation of the servo in the proper direction that produces a substantially identical output signal from each of detector devices 90, 92. Accordingly, when identical outputs from devices 90, 92 are applied to error detector 100, optimal gun mount orientation relative to the defined axis of the phosphor pattern is established. Rotational alignment of the gun mount spindle 28 is now complete, and the spindle is then azimuthally locked as by, for example, actuating a brake that immobilizes drive plate 62 and thereby the gun mount spindle, as servo 64 is decoupled therefrom.

At this juncture, that is, upon the occurrence of optical gun mount orientation and azimuthal locking of the gun mount spindle, a signal $S_E$, derived from differential amplifier 102, is applied to elevator 66 enabling the elevator to now respond to a command from the gun seal assembly station 10 that will actuate the elevator to elevate gun mount 16 into the neck 11 of cathode ray tube bulb 12. The tube, with gun mount now optimally oriented relative to the phosphor screen, is transported to the next station where sealing of the gun mount within the neck of the bulb is commenced.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. For use at a gun-seal assembly station employed in the processing of a color television cathode ray tube bulb, apparatus for automatically aligning a tri-beam electron gun mount relative to the phosphor pattern deposited upon the target surface of the face panel of said bulb, said pattern having a defined axis, said assembly station having means for supporting said bulb so that said defined axis of said phosphor pattern is established and maintained in a reference position, said gun mount including an electrode structure having an unobstructed passage therethrough, the central axis of said passage being substantially perpendicular to the geometric axis of said mount, said alignment apparatus comprising:

means for supporting said gun mount, with its geometric axis substantially coincident with an extension of the neck axis of said bulb, for rotation about its said geometric axis;

a driver for rotating said gun mount support means;

a source of coherent electromagnetic radiation for developing a beam of spatially coherent light;

beam expander means responsive to the output of said source for producing an expanded beam of substantially collimated light;

a beam splitter responsive to the output of said beam expander means for deriving first and second relatively stable, in time, beams of substantially collimated light;

means for directing said first and second beams along separate paths which extend through and intersect within said electrode structure optical passage;

means interposed between said beam splitter means and said electrode passage for truncating the transverse extent of said first and second beams;

first and second light detector devices terminating said first and second beam paths and individually responsive to an assigned one of said first and second truncated beams, subsequent to their partial transmission through said electrode optical passage, for developing respective first and second detector signals each of a magnitude proportional to the quantity of intercepted collimated light energy instantaneously transmitted through said electrode optical passage; and error detector means responsive to said detector signals for developing a resultant control signal for application to said gun mount driver said resultant control signal having a magnitude and a sense determined by the algebraic difference of said detector signals, said control signal effective to induce rotation of said gun mount driver in a direction to produce a substantially identical signal from each of said detector devices thereby establishing optimal gun mount orientation relative to said defined axis of said phosphor pattern.

2. Alignment apparatus as set forth in claim 1 in which said driver for rotating said gun mount comprises a servomechanism.

3. Alignment apparatus as set forth in claim 1 in which said source of electromagnetic radiation comprises a helium-neon laser.

4. Alignment apparatus as set forth in claim 1 in which said light detector devices comprise photo diodes.

5. Alignment apparatus as set forth in claim 1 in which the angle of intersection between said first and second beams is defined as one having a sine equal to s/d where s is the width of said electrode optical passage and d is the outer diameter of said electrode structure.

6. Alignment apparatus as set forth in claim 1 in which said error detector means comprises a differential amplifier.

7. Alignment apparatus as set forth in claim 1 in which said first and second beams are of substantially equal intensity.

8. Alignment apparatus as set forth in claim 1 which further includes means for azimuthally locking said means for supporting said gun mount to retain said optimal gun mount orientation during subsequent operations in which said aligned gun mount is sealed into the neck of said bulb.

* * * * *